UNITED STATES PATENT OFFICE 2,107,202

GLYCEROL MONOLACTATE TRIACETATE AND PROCESS OF MAKING SAME

Ritchie Hart Lock, Chigwell, England

No Drawing. Application December 10, 1936, Serial No. 115,269. In Great Britain December 17, 1935

8 Claims. (Cl. 260—106)

The invention relates to a process for making glycerol monolactate triacetate by causing an acetylating agent to act on glycerol monolactate in proportion sufficient for the production of a tri-ester.

As the acetylating agent there may be used acetic anhydride or acetic acid, which may be concentrated or even moderately dilute, for example, of about 90 per cent. strength.

The procedure may consist in heating glycerol monolactate with acetic acid or acetic anhydride in presence of an acetylation catalyst, for instance, at the temperature corresponding with the boiling point of the mixture. When acetic acid is used, it is advantageous to add an organic solvent, such as benzene, whose vapours can entrain water formed in the reaction.

The triacetate of glycerol monolactate is a slightly viscous liquid having a specific gravity of approximately 1.185. It is soluble to the extent of about 5 per cent. in water and completely miscible with benzene. It is stable up to 200° C. but decomposes above this temperature.

The glycerol monolactate used as parent material can be obtained by the process forming the subject of British Specification No. 456,525.

It is not necessary to isolate the glycerol monolactate obtained by that process, but the crude reaction product containing any solvent or catalyst used in the process may with advantage be acetylated directly in accordance with the present invention.

The manufacture of glycerol monolactate triacetate in accordance with the invention is illustrated by the following examples:

*Example 1.*—164 lbs. of glycerol monolactate (as obtained by the process of specification No. 456,525), 200 lbs. of glacial acetic acid, 0.25 lb. of sulphuric acid and 10 gallons of benzene are heated together in a still, the vapours which distil are condensed and the benzene layer of the condensate is separated from the aqueous layer and returned to the still. The process is continued until about 54 pounds of water have thus been separated. The contents of the still are then washed with water or a dilute alkali solution and the benzene is expelled by distillation, finally under reduced pressure. The product so obtained may be decolorized by known methods.

*Example 2.*—A mixture of 164 lbs. of glycerol monolactate, 204 lbs. of acetic anhydride and 0.25 lb. of sulphuric acid is cautiously heated in a reflux apparatus when the reaction has moderated further 102 lbs. of acetic anhydride are added, whilst the reaction mixture is gently boiled. When the reaction is nearly complete, the reaction mixture is cooled and the acetic acid is removed by washing with water or a dilute alkali solution or in some other simple manner. If unchanged acetic anhydride is present, it can be decomposed by warm water. The final product is finally freed from water under reduced pressure and decolorized.

I have found that this substance, which has not hitherto been described, has properties which render it a valuable plasticizing agent for cellulose derivatives, such as cellulose nitrate and, more particularly, cellulose acetate. It may be incorporated in relatively large quantity without adverse influence on the products; for example, in the manufacture of films from cellulose acetate the quantity of the new plasticizing agent may be as high as 150 per cent. of the weight of the cellulose ester.

The new plasticizing agent has a low volatility; in this respect it compares very favorably with triacetin, which is one of the plasticizing agents most used for cellulose acetate.

Products prepared from cellulose derivatives with the aid of the new plasticizing agent have a low inflammability.

Compositions of matter, including also coating compositions and artificial shaped products such as sheets and films, comprising or containing a cellulose derivative and glycerol monolactate triacetate as a plasticizer therefor, are the subject of divisional U. S. application Serial No. 149,547, filed June 21, 1937.

I claim:

1. The process of making glycerol monolactate triacetate which comprises causing to act on glycerol monolactate an acetylating agent in proportion at least sufficient for acetylating the three hydroxyl groups in the lactate.

2. The process of making glycerol monolactate triacetate which comprises causing to act on glycerol monolactate, acetic acid in proportion at least sufficient for acetylating the three hydroxyl groups in the lactate.

3. The process of making glycerol monolactate triacetate which comprises causing to act on glycerol monolactate, acetic anhydride in proportion at least sufficient for acetylating the three hydroxyl groups in the lactate.

4. The process of making glycerol monolactate triacetate which comprises causing to act on glycerol monolactate in presence of an esterification catalyst, acetic acid in proportion at least sufficient for acetylating the three hydroxyl groups in the lactate.

5. The process of making glycerol monolactate triacetate which comprises causing to act on glycerol monolactate in presence of an esterification catalyst, acetic anhydride in proportion at least sufficient for acetylating the three hydroxyl groups in the lactate.

6. The process of making glycerol monolactate triacetate, which comprises heating to boiling a mixture of glycerol monolactate, acetic acid in proportion at least sufficient for acetylating the three hydroxyl groups in the lactate, an esterification catalyst and benzene and withdrawing the vapours of benzene and water formed.

7. The process of making glycerol monolactate triacetate, which comprises heating to boiling a mixture of glycerol monolactate, acetic acid in proportion at least sufficient for acetylating the three hydroxyl groups in the lactate, an esterification catalyst and benzene, condensing the vapours formed, separating the condensate into layers and returning the layer of benzene to the reaction mixture until the vapours no longer contain appreciable quantities of water.

8. As a new product, glycerol monolactate triacetate, being a slightly viscous liquid of specific gravity approximately 1.185, soluble to the extent of about 5 per cent. in water, completely miscible with benzene and decomposing above 200° C.

RITCHIE HART LOCK.